United States Patent [19]
Gellert

[11] Patent Number: 5,223,275
[45] Date of Patent: Jun. 29, 1993

[54] MULTI-CAVITY INJECTION MOULDING SYSTEM

[76] Inventor: Jobst U. Gellert, 7A Prince St., Georgetown, Ontario, Canada, L7G 2X1

[21] Appl. No.: 770,112

[22] Filed: Oct. 2, 1991

Related U.S. Application Data

[63] Continuation-in-part of Ser. No. 712,093, Jun. 7, 1991, abandoned.

[30] Foreign Application Priority Data

Oct. 12, 1990 [DE] Fed. Rep. of Germany ....... 4032499
Oct. 12, 1990 [DE] Fed. Rep. of Germany ....... 4032500

[51] Int. Cl.⁵ ............................................. B29C 45/23
[52] U.S. Cl. ............................. 425/130; 264/328.8; 264/328.9; 425/562; 425/564; 425/572; 425/588
[58] Field of Search ............... 425/130, 562, 563, 564, 425/571, 572, 573, 588; 264/328.8, 328.13, 328.15, 328.9

[56] References Cited

U.S. PATENT DOCUMENTS

| | | | |
|---|---|---|---|
| 4,808,101 | 2/1989 | Schad et al. | 425/130 |
| 4,932,858 | 6/1990 | Gellert | 264/328.8 |
| 5,106,284 | 4/1992 | Kobayashi et al. | 425/130 |

FOREIGN PATENT DOCUMENTS 378138 7/1990 European Pat. Off. .
3632928 3/1988 Fed. Rep. of Germany .

OTHER PUBLICATIONS

Keith R. Kreisher, Coinjection molding is hot again--with a lot more going for it, Modern Plastics, Feb. 1990 pp. 54-56.

*Primary Examiner*—Tim Heitbrink
*Attorney, Agent, or Firm*—Dalesman & Company

[57] ABSTRACT

The present invention refers to a hot runner manifold composed of two parallel hot runner plates disposed in parallel, one behind the other, to feed at least two different plastic materials along horizontal hot runners to injection nozzles bolted to the front hot runner manifolds.

15 Claims, 11 Drawing Sheets

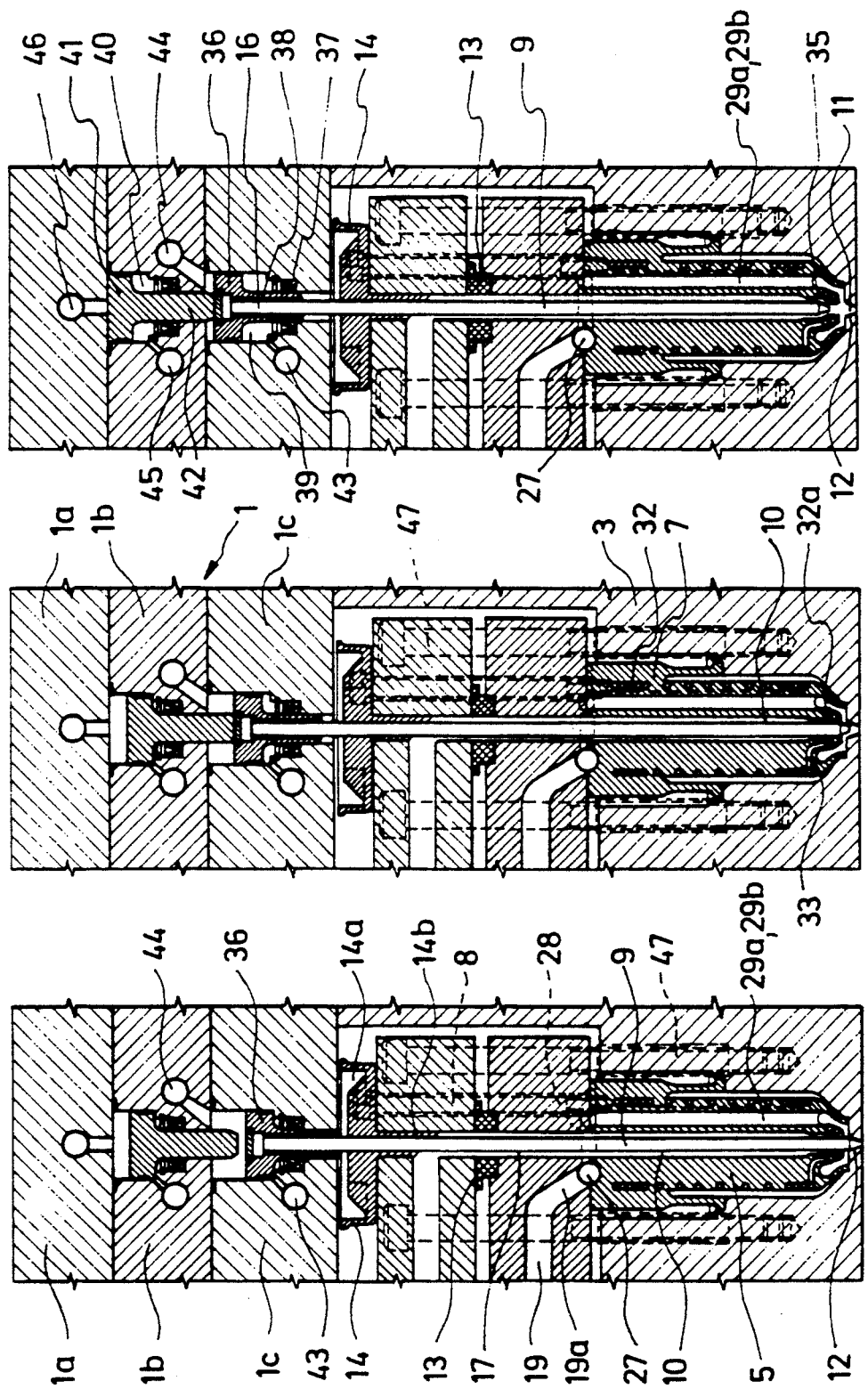

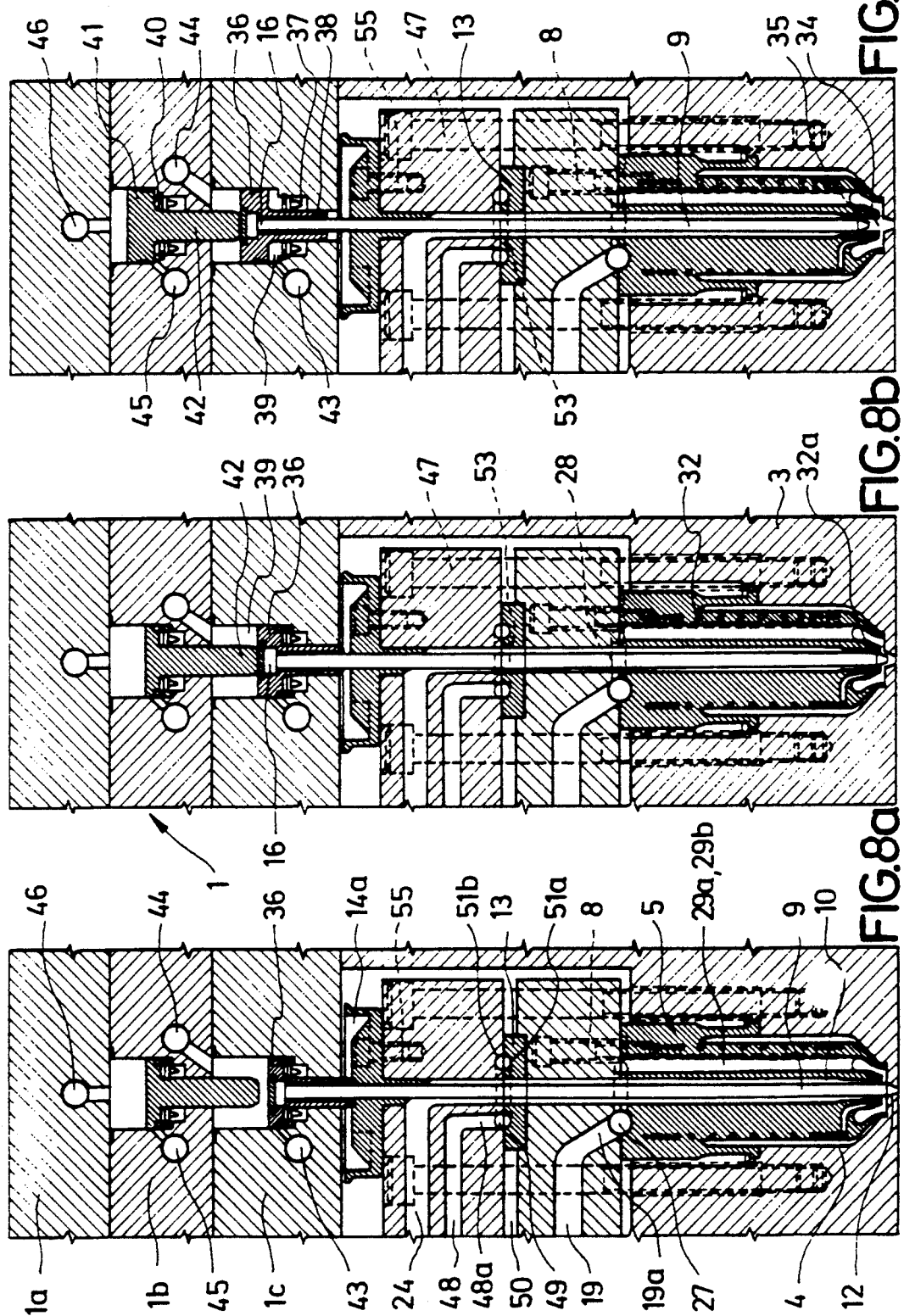

MULTI-CAVITY INJECTION MOULDING SYSTEM

This application is a continuation in part of application Ser. No. 07/712,093 filed Jun. 7, 1991, now abandoned.

BACKGROUND OF THE INVENTION

The present invention refers to a multi-cavity injection moulding system, which is adapted to be used for producing injection moulded parts consisting of at least two different plastic materials. More specifically, the present invention refers to a multi-cavity injection molding system comprising a back plate arrangement, a hot runner manifold arrangement with a first hot runner manifold for a first plastic material and a second hot runner manifold for at least one other plastic material, and injection nozzles fixed to the hot runner manifold arrangement for feeding the plastic materials to the relevant cavities defined in a cavity plate.

For many different cases of use, e.g. for plastic components used in motor vehicles, or as packaging material, or as shield means in electric or electronic devices, it is desirable to process a plurality of plastic materials of different kinds at the same time so as to obtain one plastic component; in these cases, a core layer will be embedded, and the plastic component will thus be provided with different material and/or surface properties and sandwichlike structures of materials will be obtained. For example, in the case of foodstuff packings, which are made of plastic material and which are to be used as longtime packings for highly perishable foodstuff or for foodstuff which has to be handled under difficult climatic conditions, it is necessary to embed in the first plastic material, which essentially defines the packaging body, a barrier layer of oxygen-impervious plastic. For this purpose, it is known to carry out in one injection moulding cylce joint injection moulding of two plastic melts consisting of different plastic materials (coinjection moulding, sandwich moulding) (cf. "Modern Plastics", February 1990, pages 54 to 56).

In the case of multi-cavity hot runner systems, it is, however, difficult to master the injection moulding process from the point of view of tool technology, and these difficulties prevented major progresses in the use of this multi-cavity injection moulding process for a prolonged period of time. It is especially difficult to avoid, by making use of a suitable control regime, a mixing of the various plastic melts outside of the moulding cavity and to form defined core films within an injection moulded part in connection with a basic layer of plastic material and a cover layer of plastic material within very short cycle periods.

It follows that hitherto known means for coinjection moulding (including sequential moulding) of different plastic melts very often include complicated injection moulding systems and control means, which, due to their degree of complexity, are susceptible to breakdown and are expensive, and the results achieved with the aid of these means were not always satisfactory.

For example, a multi-cavity injection moulding system for tri-injecting a plurality of thermoplastic materials to mould an article of multilayered structure is known from U.S. Pat. No. 4,808,101. Said apparatus includes a hot runner system comprising a first and second hot runner in a side by side arrangement resulting in a rheologically unbalanced flow of the different materials and a relatively complicated structure of the apparatus as, in this case, one of the three materials to be processed is fed from the side of the cavity of the apparatus while two melts are supplied from the backside as usual.

Similarly, EP-A 378 138 referring to a multilayer nozzle for an injection moulding system processing a plurality of different melts discloses a multi-cavity injection moulding apparatus wherein the different types of melts are supplied to the nozzles from opposite directions providing a lateral feeding of the nozzles.

DE-A 35 19 921 discloses a cavity injection moulding apparatus comprising a valve gated nozzle and a hot runner plate for feeding the two different types of melt to the nozzle wherein one plastic material is fed to the central melt bore receiving the valve pin while the other plastic material flows through a coaxial annular chamber towards the gate of the nozzle.

SUMMARY OF THE INVENTION

Accordingly, it is an objective of the present invention to provide a multi-cavity injection moulding system adapted to produce multilayered products from at least two different plastic materials and comprising a relatively uncomplicated structural design while using, to a large extent, structural units which prove to be suited in the art of hot runner injection moulding systems enabling a rheologically balanced flow of different melts and a uniform temperature control of the melts through the apparatus.

In order to perform the afore-indicated objective, according to the present invention, a multi-cavity injection moulding system is provided comprising a backplate arrangement, a hot runner manifold arrangement with a first hot runner manifold for a first plastic material and a second hot runner manifold for at least one other plastic material and injection nozzles fixed to the hot runner manifold arrangement for feeding the plastic materials to the relevant cavities defined in a cavity plate. More specifically, the present invention is characterized in that, the hot runner manifold forms manifold plates disposed substantially parallel one behind the other between the cavity plate and backplate arrangement wherein the first hot runner manifold supporting the injection nozzles is disposed in front of the second hot runner manifold, wherein the central melt supply channel for the first plastic material extends from a central pouring opening at the rear side of the rear plate arrangement through said backplate arrangement as well as through the second hot runner manifold towards the first hot runner manifold and is adapted to open therein in branched hot runners extending substantially horizontally therein and connecting to the related melt channel of each injection nozzle.

Preferably, the two hot runner manifolds are arranged one on top of the other in a vertical direction and they have provided between them sealing sleeve disks which also permit a lateral relative movement of said two hot runner plates which may result from different degrees of thermal expunction. Each of said sealing sleeve disks defining a section of axial bores which, in turn, are provided to lengthen the central melt bore of each injection nozzle rearwardly through the hot runner manifolds.

The first plastic melt of the first plastic material is preferably conveyed from a central inlet area, which is located on the upper side of the backplate arrangement, through a melt-distributing passage downwards through said backplate arrangement, through an insulating sleeve and through the second, upper hot runner manifold, whereupon it flows through a sealing sleeve, which is provided between the hot runner manifold, and into the lower, first hot runner manifold, a hot runner within this lower hot runner manifold, which is arranged on the side of the injection nozzles, being provided with inclined guide sections, which, for an associated injection nozzle, open into a recess, said recess being equally provided in an end face of the hot runner means, which supports the associated injection nozzle, as well as in a rear surface of the injection nozzle, which abuts on the end face of the hot runner manifold, said recess provided in the rear surface of the injection nozzle communicating with first and second melt bores for the first plastic material, and said first and second melt bores extending each axially up to a point where they open into a melt reception space in the nozzle tip of the injection nozzle and being arranged such that they are radially displaced relative to the central melt bore.

Preferably, the pouring opening for the second plastic material is disposed laterally on the second hot runner manifold which, in turn, is arranged to extend between the first hot runner manifold supporting the injection nozzles, and the backplate arrangement, said pouring opening communicates with branching hot runners extending substantially horizontally for connection with axial bores lengthening the central melt bore of each injection nozzle rearwardly.

According to another preferred embodiment of a multi-cavity injection moulding system according to the present invention, which is used for joint injection moulding of several plastic melts consisting of different materials by controlling the melts as well as a respective gate leading to a moulding cavity, is obtained on the basis of the features that valve gating is provided, in the case of which a valve pin is received in the central melt bore of each injection nozzle, said valve pin being in contact with the gate of the associated moulding cavity in a moulding cavity plate, when it is in the closed state of a front end position, and said valve pin extending through the associated injection nozzle as well as through the first and second hot runner means for control in its longitudinal direction and having its rear end received in a fluid-controlled actuating means, which is, in turn, provided in the backplate arrangement. Said multi-cavity injection moulding system is provided with at least one first hot runner manifold for the first plastic material, which defines a reception means for the injection nozzles and the hot runners of which respectively communicate with a first melt passage used for the first plastic material and radially displaced relative to the central melt bore of each injection nozzle. The multi-cavity injection moulding system additionally comprises the second hot runner manifold, which is connected to the first hot runner manifold and designed to form a hot runner plate in parallel to the first plate-like hot runner manifold. The hot runners of the second manifold communicate with an axial bore lengthening the central melt bore of each injection nozzle and receiving the valve pin therein, and the valve pin actuating device being adapted to be actuated so as to control the valve pin of each injection nozzle such that it is moved to an intermediate position between a rear open end position and a front closing end position.

In accordance with a specially preferred embodiment of the present invention, the rear end of each valve pin is received in a hydraulically controlled piston, which is sealingly arranged in a cylinder space of a first backplate, said cylinder space being adapted to be independently acted upon by hydraulic pressure at both sides of the piston. A second backplate, which is superimposed on said first backplate, seals the cylinder space of said first backplate and is also provided with a cylinder space, which is coaxial to the first-mentioned cylinder space and which has slidably supported therein a stop piston provided with a cylindrical stop member projecting into the cylinder space of the first backplate and defining a means for limiting the stroke of the piston, which receives therein the rear end of the valve pin. In connection with independent, rheologically balanced, hydraulic control passages, which are delimited by an upper, third backplate, the stop piston is adapted to be controlled such that it is movable at least between a lower end position and an upper end position.

Thus, according to another preferred embodiment of the present invention adapted to introduce a third plastic material, the second hot runner manifold comprises a central sleeve communicating with the central, first pouring opening by means of a first melt supply passage for the first plastic material and defining a passage sleeve for said first plastic material to convey same towards the first hot runner manifold. Moreover, said central sleeve inserted into the second hot runner manifold also serves as a distributing sleeve for the second and third plastic materials within the second hot runner manifold. The aforementioned embodiment specifically is adapted to deposit the third plastic material as a film layer on the periphery of the second melt flow and this third plastic material is supplied onto the outflow of the second plastic material preferably within a boundary area between said first and second hot runner manifolds. In this way, the third plastic material is preferably adapted to define an intermediate layer between the second plastic material forming a barrier layer in the finished multilayered article and the first plastic material which forms the basic and cover layer material of the molded product.

Preferably, the central sleeve is designed to distribute the second and third plastic materials to hot runners extending in substantially horizontal planes through the second hot runner manifold.

An advantageous rheologically balanced mode of guiding the melt's in the area of the hot runner manifolds can be achieved on the basis of the features that a second supply passage for the second plastic material extends preferably from the second pouring opening, which is arranged laterally on the second hot runner means, to the central sleeve, and a third supply passage for the third plastic material extends from a third inlet opening, which is arranged laterally on the second hot runner means, to the central sleeve, said second and third supply passages extending essentially horizontally and at an angle of approximately 90° relative to each other and each of said two supply passages including an angle of approximately 90° with said first supply passage in orthogonal vertical planes. This type of simplified structural design of the tool is supported by the feature that the central sleeve is preferably provided with first and second axially spaced circumferential recesses or annular grooves, which are used for connecting the second supply passage to the second melt-distributing passages of the second hot runner means and which are used for connecting the third supply passage to the third melt-distributing passages of the second hot runner means.

With regard to the mode of conveying the various plastic materials through the hot runner system, a particularly advantageous structural design of the injection moulding system is obtained on the basis of the features that the first central pouring opening for the first plastic material, which is provided on the upper back of the multi-cavity injection moulding system, communicates with the first supply passage, which extends through the central sleeve installed in the second hot runner manifold as well as through a sealing sleeve disc provided between said second and first hot runner manifolds and which opens into the hot runners of the first hot runner manifold located on the side of the injection nozzles. In this connection, the second pouring opening for the second plastic material is preferably formed laterally on the second hot runner manifold, and it is arranged such that it communicates with the second hot runners of the second hot runner manifold for connection with the axial bore lengthening the central melt bore of each injection nozzle. The third pouring opening for the third plastic material is formed laterally on the second hot runner means, preferably such that it is displaced by 90° relative to the second pouring opening for the second plastic material and communicates with third hot runners for the third plastic material for connection with a supply means feeding the third plastic material into the axial bore separately from the second plastic material.

The melt of the third plastic material can be applied in an advantageous manner to the melt of the second plastic material in the area of the axial bore on the basis of the features that the supply means comprises a sealing sleeve disc in the area of the axial bore between said first and second hot runner means, said sealing sleeve disc being provided with an annular recess formed in the end face of the sealing sleeve, which produces a sealing effect with respect to the second hot runner means, and disposed in radially spaced relationship with the sealing sleeve central bore defining a section of the axial bore, said annular recess opening into said central bore via at least one gap opening.

A compact arrangement of the injection nozzles in combination with a balanced, rheological guidance of the melts in the associated hot runner means in equilibrium is achieved in an advantageous manner on the basis of the features that the recesses of neighbouring injection nozzles face each other and that inclined guide sections, which branch off central melt distributing passages in said first hot runner means, connect essentially symmetrically a respective melt-distributing passage to oppositely disposed recesses of neighbouring injection nozzles.

A high heating capacity, which is adapted to be controlled with little delay, can be provided in an advantageous manner directly in the front end portion of each injection nozzle by providing the feature that at least part of a heating means is arranged in the nozzle tip of each injection nozzle, said heating means surrounding an opening of the central melt passage.

Additional preferred embodiments of the subject matter of the present invention are explained in the remaining subclaims.

In the following, the present invention will be explained in detail on the basis of two embodiments and associated drawings.

DESCRIPTION OF THE PREFERRED EMBODIMENTS

Figure 1:
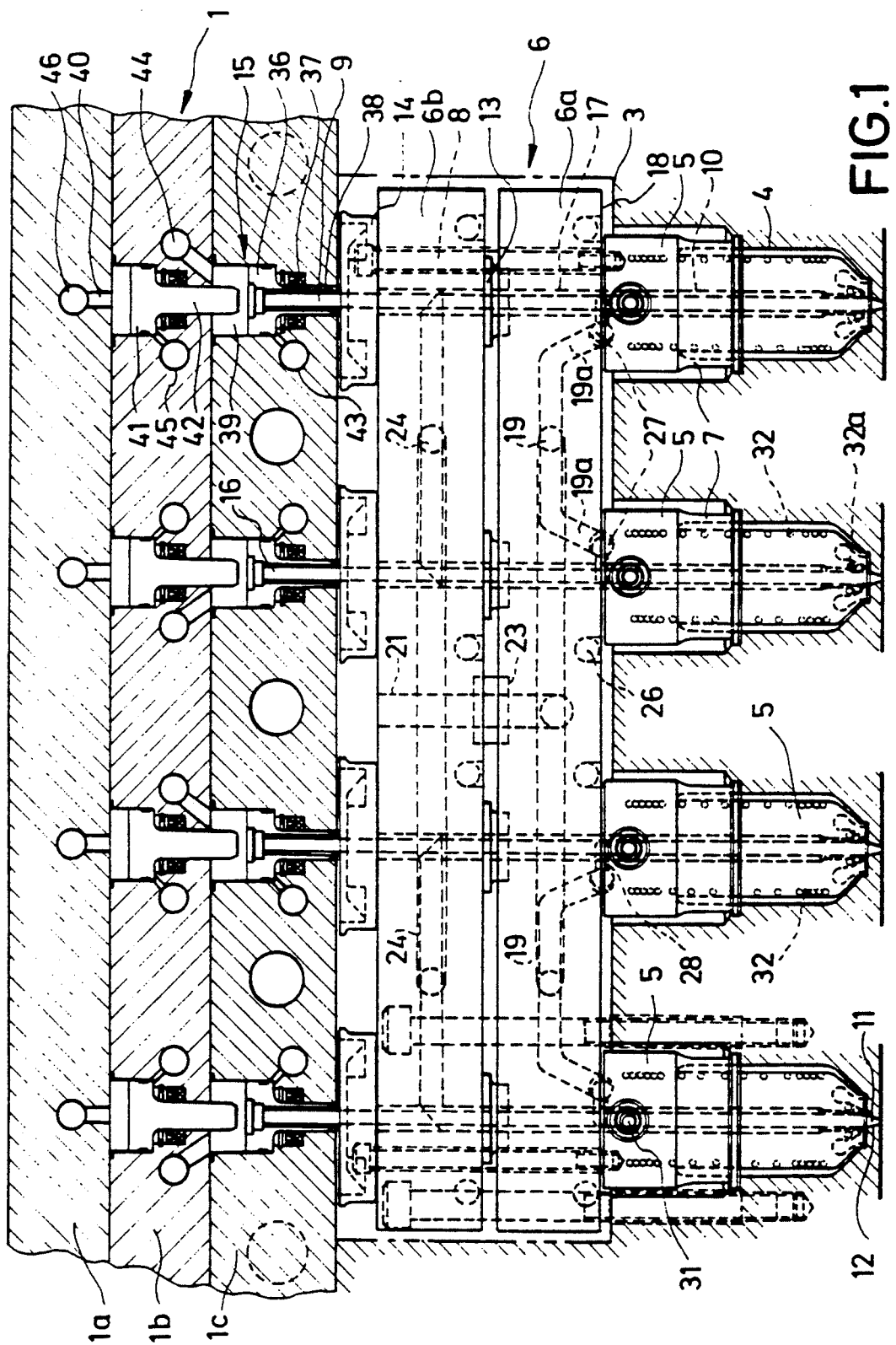
FIG. 1 shows a fragmentary front view of a multi-cavity injection moulding system (partially in a sectional view) for injection moulding two different plastic materials according to one embodiment of the present invention.
Figure 2:
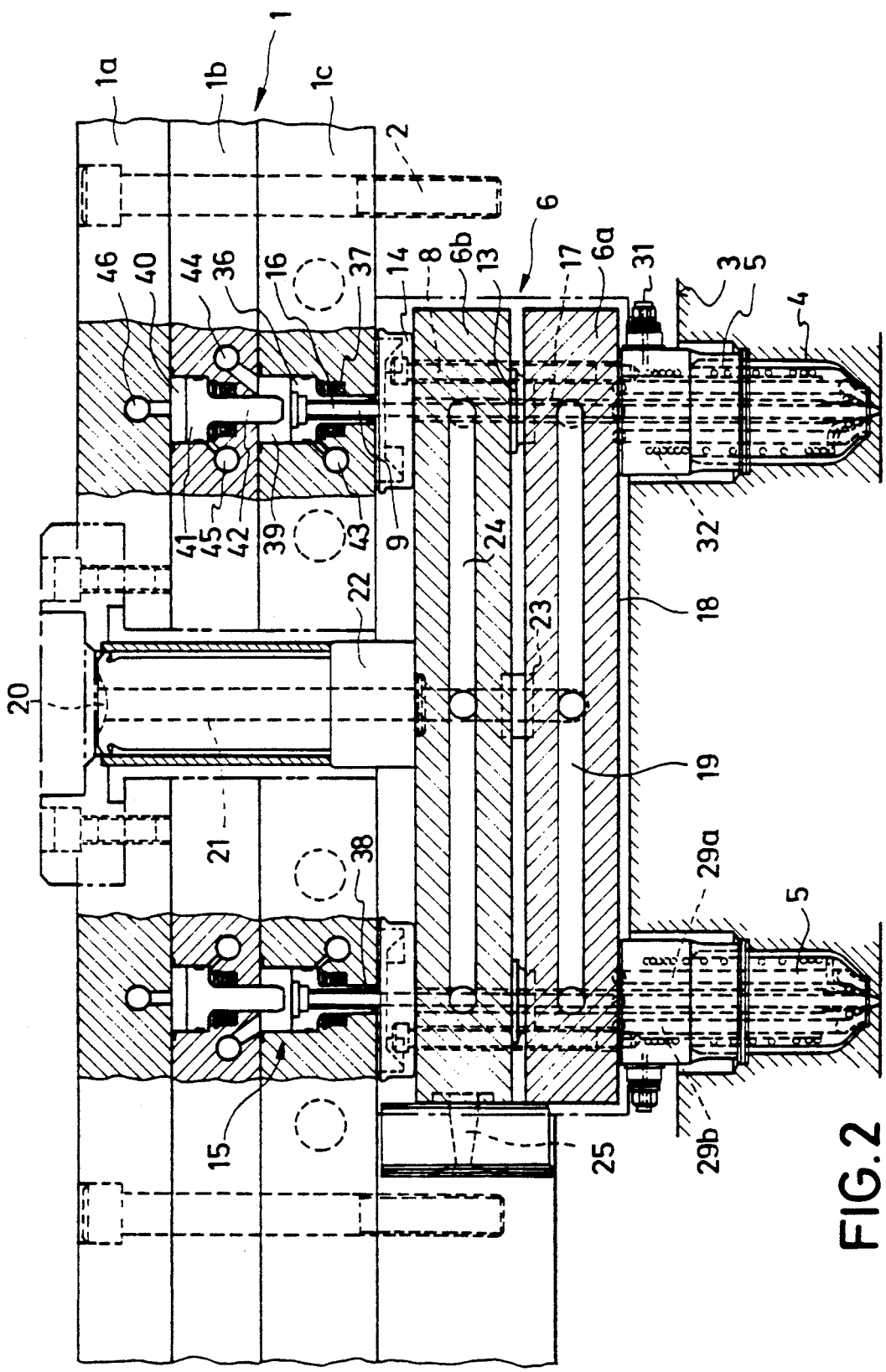
FIG. 2 shows a side view, partially in a sectional view, according to FIG. 1, FIGS. 3a to 3e show a sectional view of the multi-cavity injection moulding system according to FIG. 1 in the area of an injection nozzle in a schematic representation for explaining the individual phases of an injection moulding cycle for injection moulding of two plastic materials.

The fundamental structural design of a first embodiment of a multi-cavity injection moulding system according to the present invention adapted to inject two types of plastic materials is first explained on the basis of FIGS. 1 and 2. These figures show schematically, in a front view and in a side view, an injection moulding system for carrying out simultaneous injection moulding of eight injection moulded parts, each of said injection moulded parts comprising two components, i.e. a first plastic material as a base and as a cover layer material and a second plastic material as a core material.

The figures show the multi-cavity injection moulding system only in its upper part, i.e. they show said system essentially without any moulding cavity plate and without the associated moulding cavities.

The multi-cavity injection moulding system includes a backplate arrangement 1, which is screw-fastened to a cooled moulding cavity plate 3 (cf. also FIG. 3) by means of screws 2 (FIG. 2), said moulding cavity plate 3 being provided with openings 4, which are adapted to receive therein an injection nozzle 5, said injections nozzles 5 being respectively secured to a hot runner system 6 formed between the cooled moulding cavity plate 3 and the backplate arrangement 1. Each of the injection nozzles 5 is provided with an insulating flange 7, which, on the one hand, serves to effect heat-insulated centering of each injection nozzle in the moulding cavity plate 3 and which, on the other hand, serves as a screw-fastening body for fastening the injection nozzles 5 to the hot runner system 6 by means of screws 8. The present embodiment shows a multi-cavity injection moulding system provided with valve pin gating so that each injection nozzle 5 has a valve pin 9, which extends through a central melt bore 10 and which, in a closed position, has a tip end 11 inserted in a gate 12, said central melt bore 10 extending through the respective injection nozzle 5 as a central longitudinal bore. The respective valve pin 9 extends through a hot runner system 6, which includes a sealing sleeve disc 13, and through a guide sleeve 14, which is arranged in this area between the hot runner system 6 and the backplate arrangement 1, into said backplate arrangement 1 including a hydraulic actuating device 15 for a driven, rear end 16 of the valve pin 9.

The multi-cavity injection moulding system according to the present invention is provided for the purpose of producing injection-moulded parts, which integrally comprise two plastic materials, a first plastic melt of a first plastic material and a second plastic melt of a second plastic material being processed in one injection cycle. In the present case, the hot runner system 6 consists of a first hot runner manifold 6a and of a second hot runner manifold 6b arranged above the first one. Both hot runner manifolds 6a, 6b form separate plates and are arranged such that sealing sleeves 13 are inserted between them, said sealing sleeves 13 providing the possibility of sealingly arranging the hot runner manifolds 6a, 6b. Moreover, they are provided to sealingly receive the valve pin axial bores 17 as well as to permit different thermal expansions, which depend on the respective temperature differences, and sliding movements of the hot runner manifolds 6a, 6b relative to each other, said relative sliding movements resulting from said different thermal expansions. The lower, first hot runner manifold 6a, the front end surface 18 of which also defines a sealed reception means for the injection nozzles 5 fixed to said end surface 18 by means of the screws 8, passes the melt of the first plastic material through the hot runners 19, which have supplied thereto the first plastic material from a central, first pouring opening 20, which is centrally provided at the upper back of the multi-cavity injection moulding system, via a central supply passage 21 extending through the backplate arrangement 1, a central positioning and sealing sleeve 22, the second hot runner manifold 6b and an additional sealing sleeve disc 23 up to the point where it opens into one of the hot runners 19 of the first hot runner manifold 6a.

The second hot runner manifold 6b has hot runners 24, which open into the valve pin axial bore 17 for each injection nozzle 5 for the purpose of feeding the second plastic material into the central melt bore 10 of each injection nozzle 5—which contains also the valve pin 9. A pouring opening 25 (FIG. 2), which communicates with the hot runners 24 of the second hot runner manifold 6b, is laterally provided in said second, upper hot runner manifold 6b. The hot runner manifolds 6a, 6b are heated in the conventional manner by means of integrally embedded heating elements 26 (FIG. 1), which are bonded to said hot runner manifolds 6a, 6b and the electric connections of which are not shown in the present case, so as to guarantee—depending on the selected combination of materials for the first and second plastic materials—an optimum temperature of the melt along the hot runners 19, 24 in each of the hot runner manifolds 6a, 6b. Depending on the required viscosity and operating temperature for the first and second plastic materials, which are guided through the first and second hot runner plates 6a, 6b, respectively, the temperature of each hot runner plates 6a, 6b can be different, and said temperatures can be controlled in connection with thermocouples, which are not shown in the present case. Due to the sealing and sliding fit between the hot runner plates 6a, 6b, which is guaranteed by means of the sealing sleeve discs 13, 23 in connection with the central positioning and sealing sleeve 22, said hot runner plates 6a, 6b can carry out thermal expansion movements relative to each other, said thermal expansion movements being caused by the respective temperature differences.

As is especially elucidated by FIG. 1 as well as by FIGS. 3a to 3e, the hot runners 19 of the first, lower hot runner manifold 6a, which carries the injection nozzles 5 in the moulding cavity plate 3, open into recesses 27 via inclined guide sections 19a extending symmetrically with respect to a hot runner passage 19 towards neighbouring injection nozzles 5, each of said recesses 27 being provided such that part of it is formed in the front end face 18 of the lower hot runner manifold 6a and that a second corresponding part is formed in a rear surface of the injection nozzle 5. It follows that one half of the recess 27 is formed in the hot runner manifold 6a, whereas the other half is formed in the rear surface of the associated injection nozzle 5 in opposite relationship therewith so that the sealing fit of the injection nozzle 5 on the hot runner manifold 6a also defines a plane of division for the recess 27 and for sickleshaped melt passage sections 28 following said recess 27 and extending in the circumferential direction in a rear end face of the injection nozzle 5. The oppositely disposed ends of the sickleshaped melt passages 28 are connected to first and second melt bores 29a, 29b (for reasons of representation, FIGS. 3a to 3e only show the melt bore 29a), which extend axially through the nozzle 5, said ends of the melt passages 28 being radially symmetrically displaced with respect to the central melt bore 10.

Figure 9:
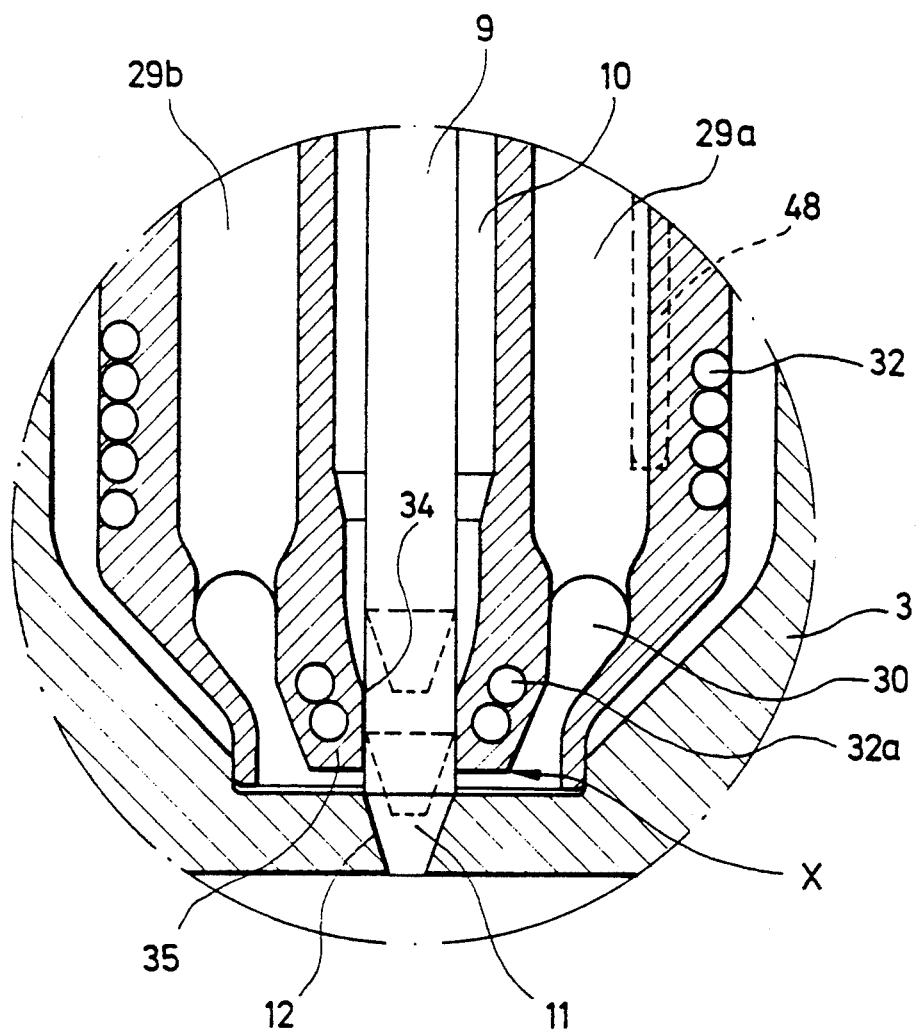
FIG. 9 shows a nozzle tip of an injection nozzle according to FIG. 5 schematically and in an enlarged representation.

As is clearly shown in FIG. 9, the first and second melt bores 29a, 29b, which carry the melt of the first plastic material, open into an annular space 30 in the nozzle tip of each injection nozzle 5, said annular space 30 surrounding a tip end of the central melt bore 10 carrying the second plastic material.

It is thus possible to supply in an advantageous manner, with the aid of the first and second hot runner means 6a, 6b which are arranged one behind the other and formed as spaced plates disposed in parallel and with the aid of the hot runners 19 and 24 (which are provided in said first and second hot runner manifolds 6a, 6b independently of one another), the melt of the first plastic material through the first and second melt bores 29a, 29b of each injection nozzle 5 separately from the second melt of the second plastic material, which is conveyed through the central melt bore 10 of each injection nozzle 5, and to make it available in the area of the gate 12 of an associated moulding cavity of the multi-cavity injection moulding system.

In FIG. 1 and 2, reference numeral 31 is used for referring to the electric connections for a heating element 32, which is provided in each of the heated injection nozzles 5 of the multi-cavity injection moulding system.

As can be seen from the schematic representations shown especially in FIG. 3a to 3e, a rear section of the heating element 32 in the area of the insulating flange 7 is defined by windings which are placed closely together, said windings being especially embedded in a continuous axial groove and permitting an increased heating capacity in the area of the injection nozzle 5 in which an increased amount of heat is carried off by the neighbouring, cooled moulding cavity plate 3. In a cylindrical outer surface of each injection nozzle 5, the additional windings of the heating element 32 are accommodated in a spiral passage in spaced relationship with one another, and in the front end portion of the injection nozzle 5 windings which are placed closely together are again provided by modifying the spiral passage such that it defines an axial groove so that in the area where the heated injection nozzle 5 is installed in the cooled moulding cavity plate and where an increased amount of heat is, consequently, carried off, the watt density of the heating element can be increased as well.

A point of special importance for co- and sequential-moulding of the second plastic material through the central melt bore 10 as well as of the first plastic material through the first and second melt bores 29a, 29b opening into the annular space 30, is the provision of a tip end 32a of the heating element 32 in the nozzle tip around the mouth of the central melt bore 10, said melt bore being controlled by the valve pin 9 as well. For this purpose, the front end of the heating element 32, which extends along the outer periphery of the injection nozzle 5, extends via a radial passage 33 inwards and into the tip of a nozzle mouthpiece 35 defining an opening 34 of the central melt bore, and in said nozzle mouthpiece 35 it is preferably arranged in two windings. This permits a temperature control for the first and second melts of said first and second plastic materials, which can be effected with very little delay directly in the area of the gate 12 of the multi-cavity injection moulding system. The arrow X in FIG. 9 serves to indicate an adjustable axial dimension of the nozzle mouthpiece 35 for forming a hot film.

The valve pin 9, which is adapted to be controlled in the longitudinal direction of each injection nozzle 5, has its rear end 16 received in a reception piston 36 of the hydraulic actuating device 15 in a lower, third backplate 1c, which forms part of the backplate arrangement 1 and which faces the hot runner system 6. The reception piston 36 is received in a sealing ring 37 having a sealing projection 38, and it is adapted to be slidably displaced in a cylinder space 39 of the third backplate 1c. Control passages 43, 44, which are acted upon by hydraulic pressure and which are provided in the third backplate 1c as well as in a backplate 1b arranged above said third backplate 1c and sealing the cylinder space 39, permit a double stroke control of the reception piston 36.

As will be explained in detail hereinbelow on the basis of FIG. 3a to 3e, the longitudinal control of the valve pin 9 which is preferably provided for the sequential injection moulding of the first and second plastic materials for a multi-component injection moulded part in a multi-cavity injection moulding system with valve pin gating—which is referred to in the case of the present embodiment—should be of such a nature that this control permits, in one injection moulding cycle, injection moulding of the first plastic material through the first and second melt bores 29a, 29b and the annular space 30 of the injection nozzle 5 in the direction of a gate 12 for forming a basic layer of the injection moulded part, subsequent injection moulding of the second plastic material from the central melt bore 10 for forming a core material layer, and final, renewed injection moulding of the first plastic material, essentially without any mixing of the first and second plastic melts upstream of the gate 12.

In connection with the valve pin gating of the gate 12, it is not only necessary to control the valve pin 9 between a closed end position, in which the pin tip of the valve pin 9 is inserted in the gate 12 and closes an associated moulding cavity, and an open end position, in which the gate 12 permits a melt of a plastic material to enter said gate 12, but it is also necessary to provide an intermediate position of the valve pin 9, in which the gate 12 is left open although the central melt bore 10 and the opening 34 in the nozzle mouthpiece 35 are closed. In said intermediate position, the central melt bore 10 is closed by the valve pin 9, but, due to the connection of the gate 12 with the annular space 30 and with the first and second melt bores 29a, 29b for the first plastic material, it is possible to inject said first plastic material separately from the second plastic material.

For this purpose, the hydraulic actuating means 15 includes, in the second backplate 1b, an additional cylinder space 40 having arranged therein a stop piston 41, which is adapted to be slidably displaced and which, being a step piston, projects coaxially into the cylinder space 39 of the third backplate 1c with an axial stop projection 42 used simultaneously for the purpose of guiding the piston. Said stop piston 41 limits an axial displacement of the reception piston 36, which directly controls the valve needle 9, depending on an upper, retracted end position or a front, advanced end position, so that the axial position of the valve pin 9 and of the reception piston 36, respectively, with regard to a retracted end position (open) of the valve pin 9 and an intermediate position is controlled by the control of the stop piston 41. An additional control passage 45, which contains hydraulic fluid and which is provided in the second backplate 1b, as well as a hydraulic fluid control passage 46, which is provided in an upper, first backplate 1a closing the multi-cavity injection moulding system at the top, are used for this purpose so that double stroke control can also be effected in the case of the stop piston 41.

However, depending on the respective injection moulding problem, the structure of layers within the injection moulded part to be produced, the configuration of said injection moulded part, the extension of the barrier layer consisting of the second plastic material, the nature of the plastic materials used etc., it is possible to dispense with the piston control of the intermediate positions of the valve pin 9, and to control, in connection with pressure acting on the rear end 16 of the valve pin 9, the opening and closing movements of said valve pin 9 in a pressure-difference-dependent manner by the melt pressure (counter-pressure) of the melts of the first and/or second plastic materials. It is thus possible to achieve an obvious simplification of the backplate arrangement 1 and of the hydraulic actuating device 15 for the valve pin 9.

Making reference to FIG. 3a to 3e, the method of producing an injection moulded part, which consists of two plastic materials, is now explained.

In the present case, polypropylene is used as the first plastic material of the injection moulded part defining the basic material, whereas polyamide (nylon) is injected as a second plastic material for forming an oxygen-impervious barrier layer. The present invention is, of course, not limited to these materials, but it is also possible to use other suitable combinations of materials, which contain, for example, ethylene-vinyl-alcohol, depending on the respective fields of use and the processibility of the materials in an integral injection moulding process.

Figure 3D:
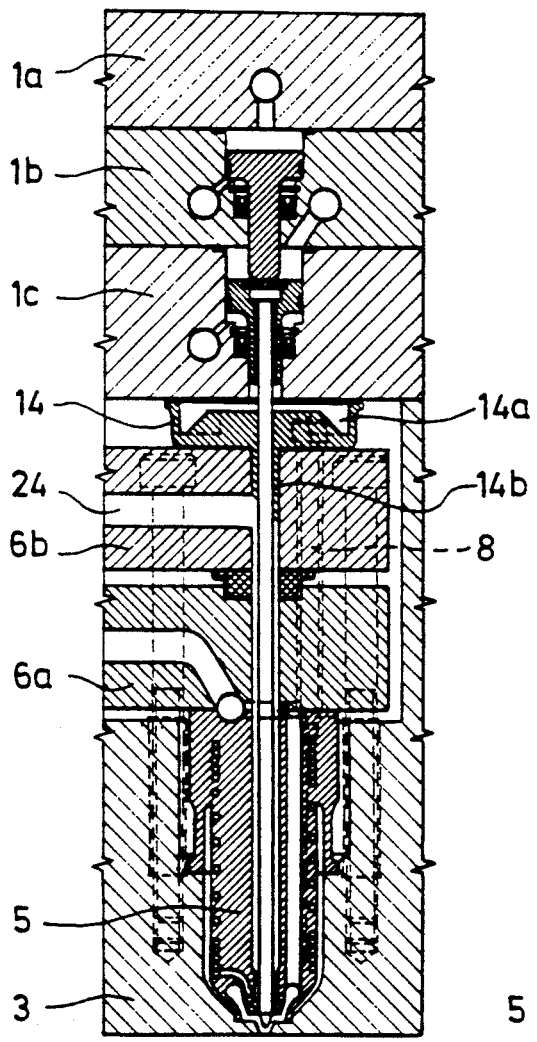

Each of FIG. 3a to 3e shows a schematic axial section through the multi-cavity injection moulding system according to FIG. 1 and 2 for an injection nozzle 5 in different phases of an injection moulding cycle. FIG. 3a shows the injection moulding system at the beginning of an injection moulding cycle. In this condition, the gate 12 of the moulding cavity plate 3 is closed by the valve pin 9, and the reception piston 36 is, consequently, in a lower end position corresponding to the closed end position of the valve pin 9. The control passage 44 for the hydraulic fluid, which is provided in the backplate 1b and which communicates with the cylinder space 39, has applied thereto a hydraulic pressure which is higher than that of the control passage 43 provided in the third backplate 1c. The value of the hydraulic control pressure within the control passage 43 can correspond to the control pressure within the control passage 46, which is provided in the first backplate 1a and which is used for the stop piston 41. The hydraulic pressure within the additional control passage 45 of the second backplate 1b can be maintained at the level of the control pressure within the hydraulic passage of the third backplate 1c and of the first backplate 1a in this phase. The control passages 43, 45, 46 are preferably in a pressure-relief state, whereas the control passage 44 has a supply pressure applied thereto.

The valve pin 9 extends from the location where it is received in the reception piston 36 through the guide sleeve 14, which is arranged between the lower backplate 1c and the second hot runner means 6b and which has, on the one hand, an annular recess 14a for receiving therein the heads of the screws 8 for fixing and screw-fastening the injection nozzles 5 to the lower, first hot runner means 6a and, on the other hand, a cylindrical tubular projection 14b by means of which said guide sleeve 14 engages the respective axial bore 17, which forms an extension of the respective central melt bore 10 of each injection nozzle 5 and which extends through the hot runner manifolds 6a, 6b as well as through the sealing sleeve disc 13 by means of which said hot runner means are spaced, said tubular projection 14b being also used for centering the guide sleeve 14. The tubular projection 14b also serves to seal the axial bore 17 with respect to the hydraulic actuating device 15 and to deflect the melt flow of the second plastic material, which comes from the hot runner 24, into the axial bore 17 leading to the central melt bore 10. Moreover, the guide sleeve 14 is used as an axial pressure reception sleeve against the lower, third backplate 1c in cases in which thermal expansion of the two hot runner means 6a, 6b occurs.

FIG. 3a to 3e show also clearly how the hot runner plates 6a, 6b are fastened by means of screws to the moulding cavity plate 3 (screws 47) and how the respective injection nozzle 5 is installed in the moulding cavity plate 3 as well as how the melt of the first plastic material is distributed through the respective hot runner 19 and the inclined guide section 19a leading to the recess 27 at the back of the injection nozzle 5 and the front end face 18 of the first hot runner manifold 6a, respectively. Moreover, it is shown how the melt of the first plastic material is further convezed through the rear melt passages 28 to the first and second melt bores 29a, 29b of the nozzles. Each of said FIGS. 3a to 3e shows only one of the two first and second melt bores 29a, 29b, which are arranged at radially equal distances from the central melt bore 10 (cf., however, FIG. 9). The melt bores 29a, 29b open into the annular space 30 in the nozzle tip, whereas the central melt bore 10 extends directly opposite to the gate 12 in the opening 34 of the nozzle mouthpiece 35, which is controlled by the tip of the valve pin 9 and which contains the tip end 32a of the heating element 32.

A thermocouple 70 is used as a signal transmitter for effecting temperature control of the injection nozzle 5, said thermocouple 70 extending up to and into the front end of said injection nozzle 5.

In FIG. 3a, the gate 12 is closed by the valve needle 9, the hydraulic pressure in the control passages 43, 45 and 46 is preferably switched off, whereas a supply pressure is applied to the control passage 44.

While effecting volume and/or pressure control for the injection of the first plastic melt from the first and second melt bores 29a, 29b and while simultaneously actuating the valve needle, injection of the first plastic melt of the first plastic material through the hot runner manifold 6a including the hot runner 19, the recess 27, the melt passages 28, the first and second melt bores 29a as well as 29b and the annular space 30 into the gate 12 is carried out in the course of one injection cycle, as can be seen in FIG. 3b. In the course of this process, the valve pin 9 is drawn back to a first, rear intermediate position (which is shown in FIG. 9 as the lower representation of the tip end 11 of the valve pin 9, outlined by a broken line) for opening the gate 12 and for connecting it to the annular space 30 in such a way that a hydraulic pressure in the control passage 46 is adjusted to its maximum value, the control passage 44 remains in a depressurized state, a hydraulic pressure is built up in the control passage 43, and the hydraulic pressure in the control passage 45 is removed or rather switched off.

The stop piston 41 in the second backplate 1b is thus biased towards its lower end position so that the stop projection 42 projects into the cylinder space 39 of the third backplate 1c as far as possible and defines a stop means for the reception piston 36, which includes the rear end 16 of the valve pin 9 and which is urged rearwards by the pressure applied by the control passage 43.

In this intermediate position of the valve pin 9, which is determined by the pressure difference between the control passages 43 and 46 in connection with the stop piston 41, said valve pin 9 leaves the gate 12 open, whereas the opening 34 of the central melt bore in the heated nozzle mouthpiece 35 remains closed (cf. FIG. 9) and the first plastic melt is injected, under pressure and volume control, from the annular space 30 into the moulding cavity so as to form a basic layer of the injection moulded part.

The next phase of the injection moulding cycle is shown in FIG. 3c, where the valve pin 9 is located in its completely open position, i.e. in a rear end position. The same phase is indicated in FIG. 9 by the upper position of the tip end 11 of the valve pin 9, which is outlined by a broken line. This position is determined by the upper end position of the stop piston 41 provided with the stop projection 42 on which the reception piston 36 still abuts. For the purpose of injecting the second plastic melt through the opening 34 of the mouthpiece 35, which is left open by the valve pin 9 in its rear position, the control passages 44 and 46 are in a pressure-relief state, whereas a supply pressure within the control passages 43 and 45 biases the stop piston 41 and the reception piston 36, respectively, towards their upper end positions. While effecting pressure and volume control of the second melt of the second plastic material with respect to the melt pressure of the first plastic material, the core layer (barrier layer), which forms part of the injection moulded part and which consists of the second plastic material, is, in the course of this phase, injected through the gate 12 into the moulding cavity, essentially without any mixing with the first plastic material.

For final injection moulding of a cover layer of the injection moulded part by making use of the basic material (first plastic material), the valve pin 9 is again advanced into the intermediate position according to FIG. 3b by re-exchanging the hydraulic pressure loads between the control passage 46 and the control passage 45 and by advancing the stop piston 41 to its lower end position, the control pressure applied to the control passages 43 to 46 corresponding to that explained in connection with FIG. 3b. Although the figures, in particular FIG. 9, do not show this, the opening 34 and the valve pin 9 have provided between them a gap creating (either by means of a continuous annular gap or by means of circumferentially spaced longitudinal recesses in the inner circumferential surface of the opening 16 and/or in the outer circumferential surface of the valve pin 9) conditions of such a nature that, when the valve pin 9 is advanced to its closing end position, the melt, which is present below the tip 11 of the valve pin 9, can flow back between the opening 16 and the valve pin 9 in a direction opposite to the direction of valve pin movement. The valve pin control timing is essentially determined by the flow resistance generated in the course of this process.

Figure 3E:
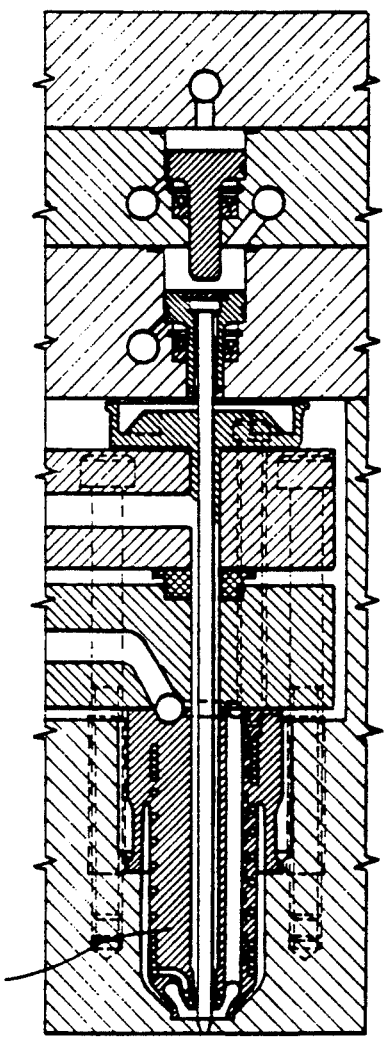

After injection moulding of the cover layer of the injection moulded part, the injection moulding cycle is terminated while maintaining the injection moulding pressure for the purpose of melt compacting for a short period of time and by closing the gate 12 by the valve pin 9, as shown in FIG. 3e, which corresponds to FIG. 3a. The pressure in the control passages 43, 45, 46 is relieved, whereas the control passage 44 has applied thereto a supply pressure (closing pressure). The above explained example of a method of producing a multi-component injection moulded part and of a multi-cavity injection moulding system adapted to be used for said method permit the production of injection moulded parts, which consist of several plastic materials, with high precision and while avoiding streams of mixed materials within the injection moulding system.

To the person skilled in the art it will be obvious that the method according to the invention and the multi-cavity injection moulding system according to the invention are, of course, not limited to the above-mentioned embodiment, and that it is, for example, also possible to process more than two different plastic materials in one injection moulding cycle for producing thus a multi-component injection moulded part. In particular for providing a reliable connection of the plastic materials so as to form one integral injection moulded part, a third plastic material can be provided as an adhesive in the case of the present method, said adhesive being effective between an inner core material layer (second plastic material) and the basic plastic material (first plastic material) surrounding said core material layer at least partially. For injecting a third plastic material as an adhesive between said first and second plastic materials, the above-explained embodiment of the multi-cavity injection moulding system may, for example, by modified by providing a feed system by means of which the melt stream of the second plastic material has circumferentially applied thereto a thin film of a third plastic material showing a strong inclination to cross-link with the first as well as with the second plastic material and improving the connection between these plastic materials within the finished injection moulded part.

An embodiment of such a system enabling three different types of resin to be used is explained below, referring to FIGS. 4 to 8. Same components are denoted by the same reference numerals as in the first embodiment of FIGS. 1 to 3e and the explanation thereof is not repeated.

FIGS. 4 to 8e show a multi-cavity injection moulding system again designed for simultaneous injection moulding of eight injection moulded parts, each injection moulded part comprising three components, i.e. a first plastic material as a base and as a cover layer material, a second plastic material as a core or barrier layer material, and a third plastic material, the latter causing an intimate connection of the first and second plastic materials so as to form an integral structure of materials and being arranged between the first and second plastic materials.

The multi-cavity injection moulding system according to this second embodiment is provided for the purpose of producing injection-moulded parts, which integrally comprise three plastic materials, a first plastic melt of a first plastic material, a second plastic melt of a second plastic material and a third melt of a third plastic material being processed in one injection cycle.

In this connection, the second plastic material, which defines a barrier layer in the first plastic material, can also be formed merely in a part of the cross-section (e.g. in a central section thereof).

While the general structure of the hot runner arrangement corresponds to that of the first embodiment of FIGS. 1 to 3e, modifications for feeding the third melts are made as follows.

From the first pouring opening 20 at the upper back of the system, the first melt is fed via a central, first supply passage 21 extending through the backplate arrangement 1, a central passage insulating sleeve 21b, the central sleeve 22 in the second hot runner manifold 6b and the sealing sleeve 23 up to the point where it opens into one of the hot runners 19 of the first hot runner plate 6a.

Figure 6:
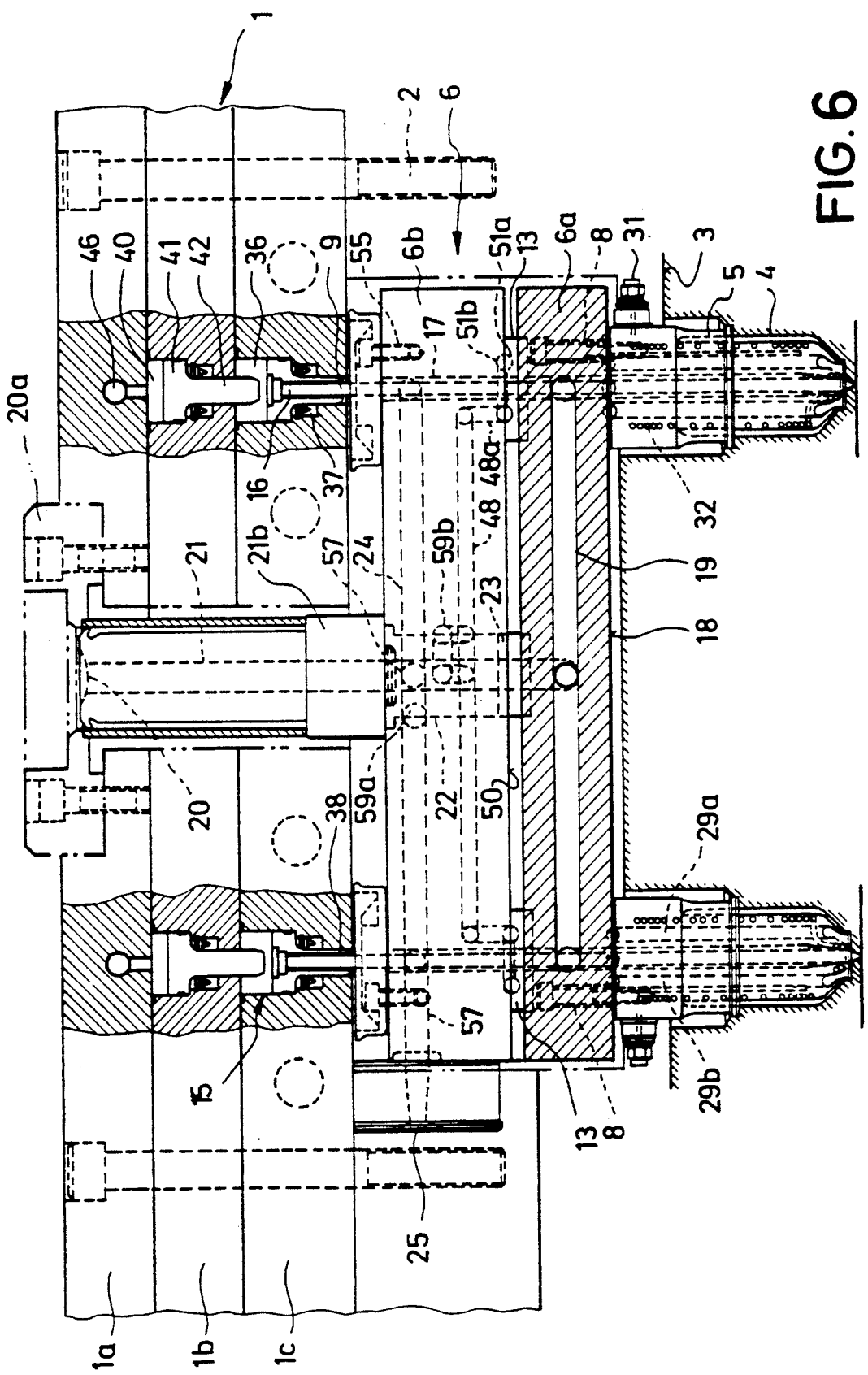
FIG. 6 shows a sectional view, similar to FIG. 2, essentially along the line B—B in FIG. 4.
Figure 7:
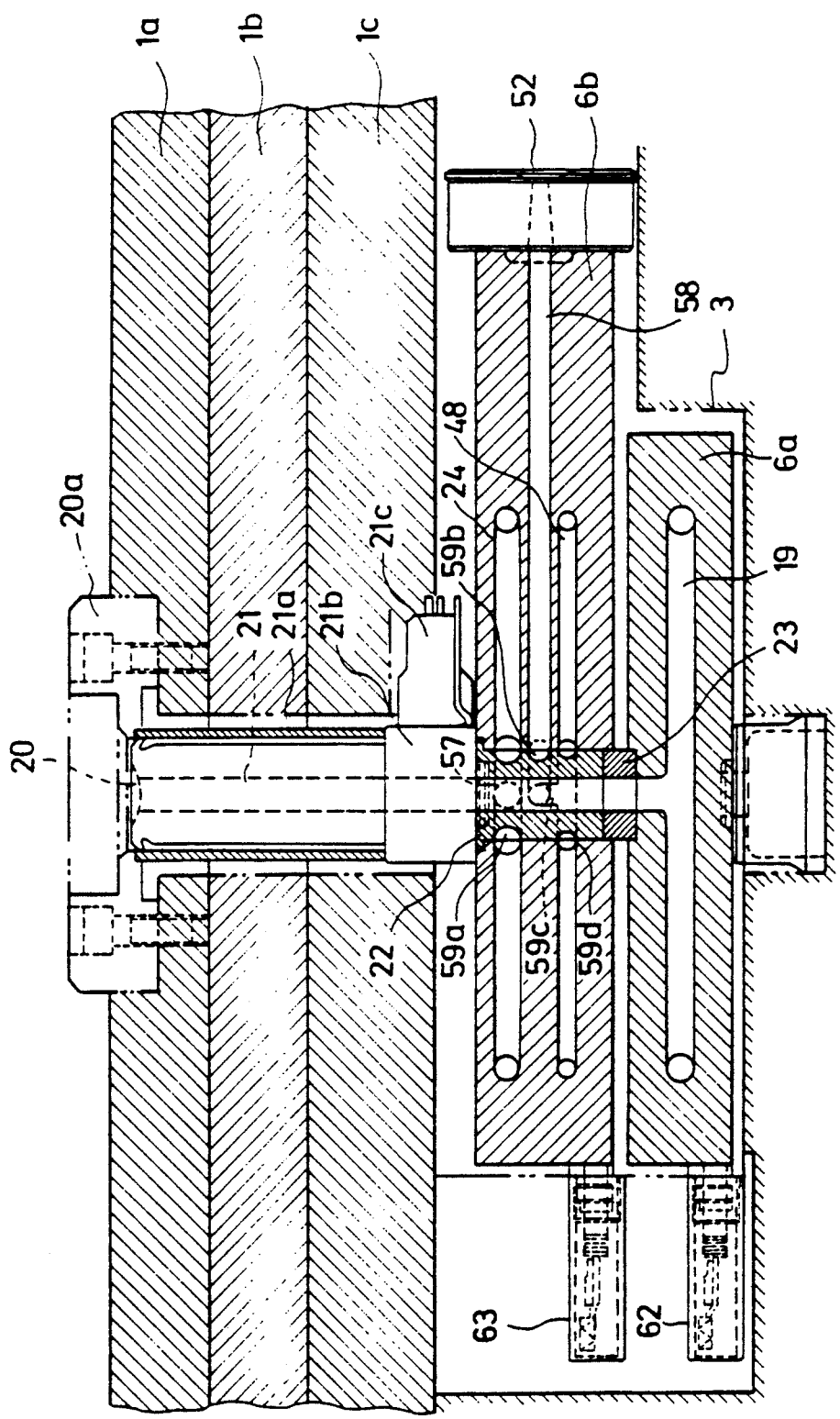
FIG. 7 shows a schematic sectional view along the line A—A according to FIG. 4, FIGS. 8a to 8e show a sectional view (detail), similar to FIGS. 3a to 3e of the injection moulding system according to FIG. 4 in the area of an injection nozzle in a schematic representation for explaining the individual phases of an injection moulding cycle for the injection moulding process of three plastic materials.
Figures 8D, 8E:
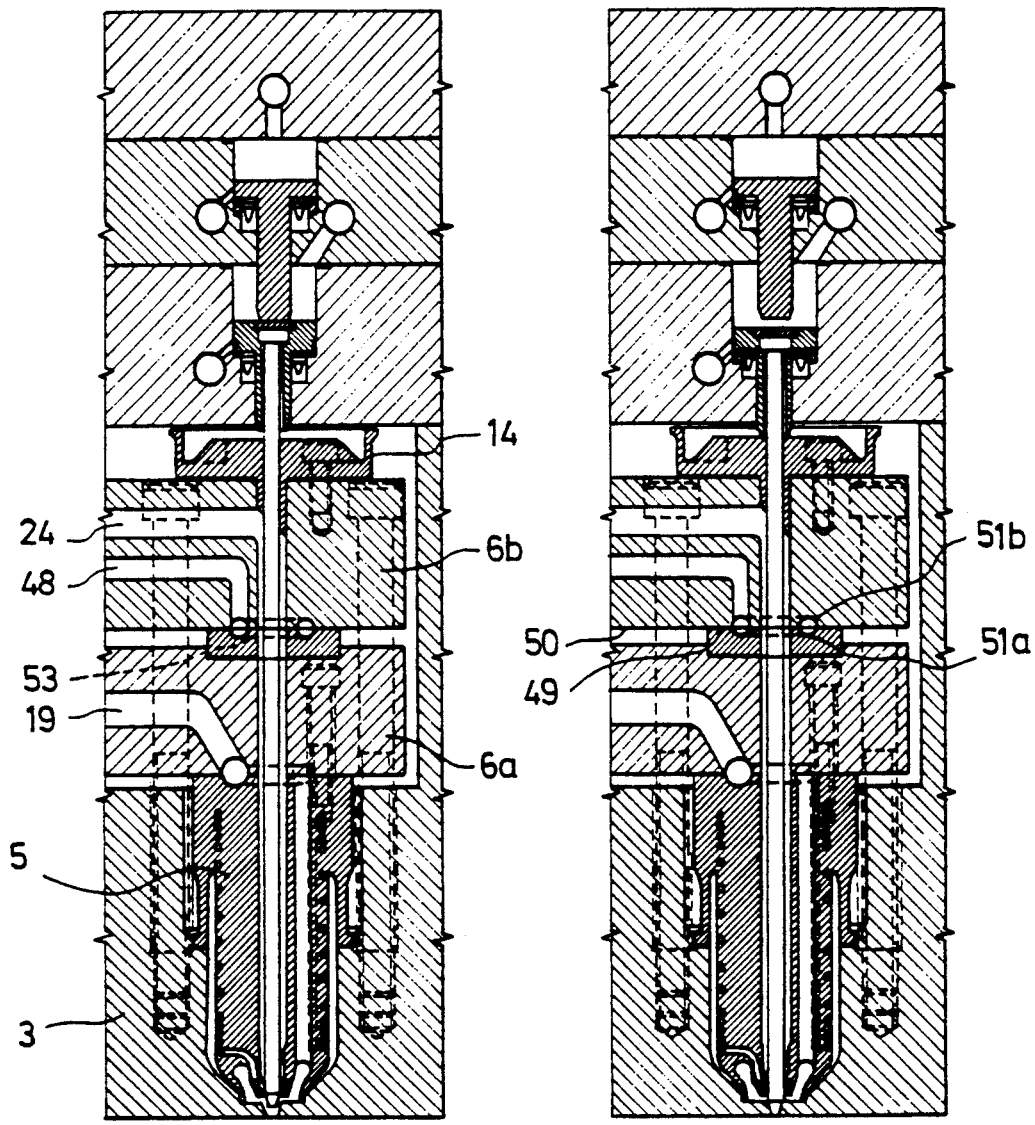

As can especially be seen from FIGS. 6 and 7, the pouring opening 20 for the first plastic material is provided with an annular flange 20a, which is fixed to the third backplate 1a of the backplate arrangement 1 by means of screws and which is followed by a passage sleeve arrangement 21a for the first supply passage 21, said passage sleeve arrangement 21a resting, in turn, on said second hot runner manifold 6b via a heated passage insulating sleeve 21b, which also seals the first supply passage 21 with respect to the second hot runner manifold 6b and which acts as a spacer between said hot runner plate 6b and said backplate arrangement 1. The passage insulating sleeve 21b, which is not shown in a sectional view in these figures, has integrally provided therein a heating element, which is connected to an electric connection means 21c.

As can especially be seen from FIGS. 6 and 7, the second and third plastic materials are supplied to the injection nozzles 5 through the second hot runner manifold 6b having, for this purpose, second and third hot runners 24, 48 which have the plastic material supplied thereto from the second and third inlet openings 25, 52 through the second hot runner manifolds 6*b* from the back thereof (pouring opening 25) and from one side of said second hot runner manifold 6*b* (pouring opening 52), respectively, through an associated second supply passage 57 and a third supply passage 58, which are displaced relative to each other by essentially 90°.

Figure 4:
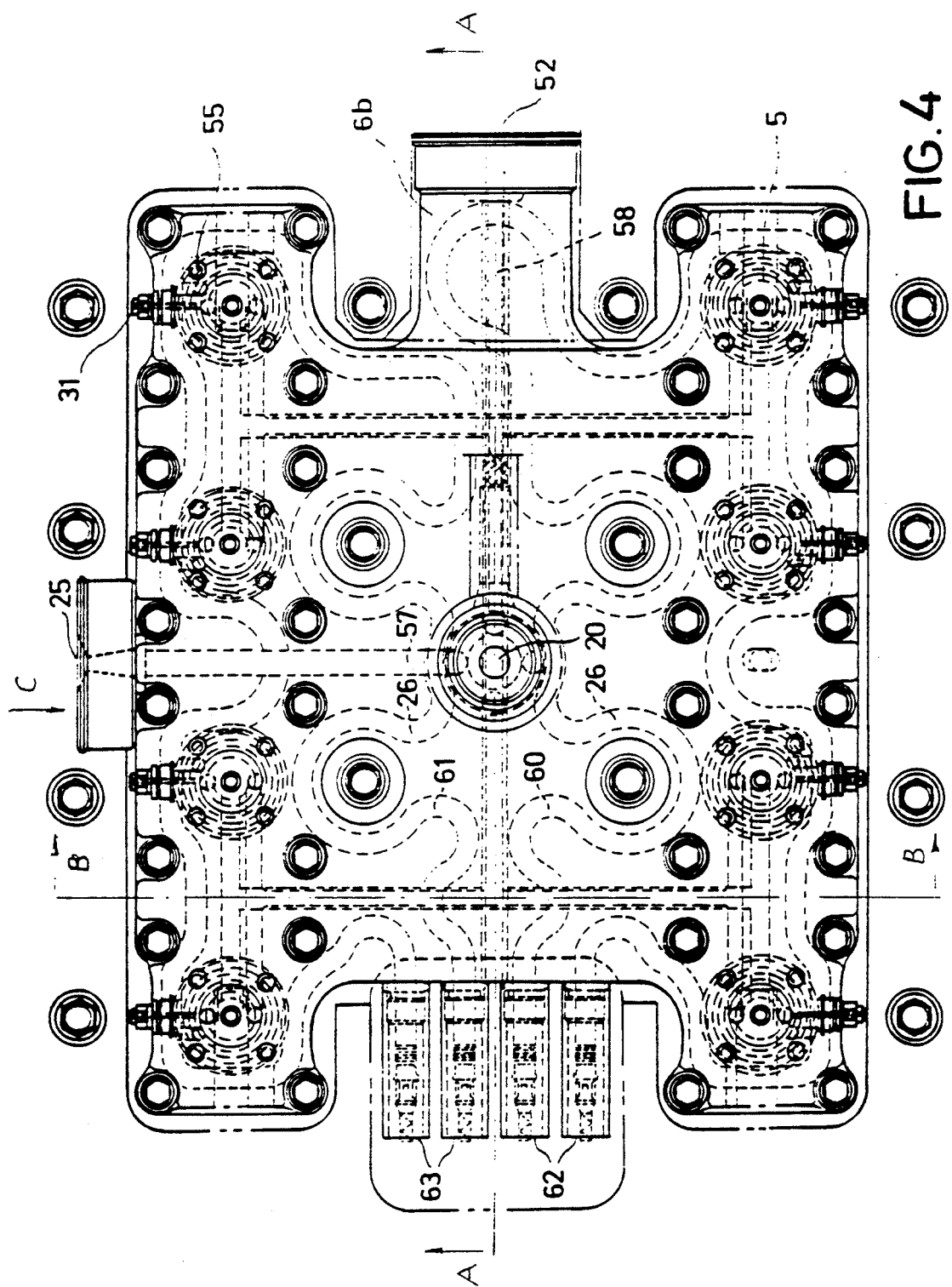
FIG. 4 shows a top view of a multi-cavity injection moulding system according to a second embodiment of the present invention.

FIG. 4 elucidates, on the one hand, the arrangement pattern of the injection nozzles 5, the position and the structural design of the first, central pouring opening 20 for the first plastic material and of the second pouring opening 25 for the second plastic material as well as of the third pouring opening 52 for the third plastic material, and the rheologically balanced mode of guiding the respective plastic melt within the injection moulding system, as will be explained in detail hereinafter. On the other hand, FIG. 1 elucidates the heating structure for heating the hot runner system by means of heating element passages 60, 61 with heating elements 26 received in said passages, which provide essentially uniform heating of the hot runner system 6 in respective horizontal planes and the electric connections of which are provided with reference numerals 62 and 63 in FIG. 1. Further details, in particular details concerning the way in which the respective melt of one of the plastic materials is guided between the relevant pouring opening 20, 25, 52 and the injection nozzle 5 in question, will be explained in detail hereinbelow.

For the purpose of achieving a thermally stabilized and rheologically balanced mode of guiding the second and third plastic melts through the second hot runner manifold 6*b* as well as an expedient, separate distribution of the second and third plastic materials among the injection nozzles 5, the supply passages 57 and 58 are arranged such that they extend, in planes which are horizontally displaced relative to each other, up to and into the central area of the multi-cavity injection moulding system, and in said area they open into first and second axially spaced annular grooves 59*a*, 59*b* of the central sleeve 22. The third supply passage 58 for the third plastic melt is connected to a third annular groove 59*d* on the outer periphery of the central sleeve 22 via the second annular groove 59*b* of the central sleeve 22 and via a peripheral axial passage 59*c*, the third melt-distributing passages 48 of the second hot runner means 6*b* opening into said third annular groove 59*d*. It follows that the central sleeve 22 serves, on the one hand, as an axial passage sleeve for providing an extension of the first supply passage 21, which carries the melt of the first plastic material, towards the lower, first hot runner manifold 6*a* and, on the other hand, it also serves as a radial distributor sleeve for providing a connection between the second and third supply passages 57, 58 for the melts of the second and third plastic materials and the associated hot runners 24 and 48, which are provided on different levels in essentially parallel planes for distributing the second and third plastic materials among the injection nozzles 5. The hot runner means 6*a* and 6*b* have provided between them, again in the central area, a sealing sleeve 23, which guides the relevant section of the first supply passage 21 and which is arranged subsequently to the central sleeve 22.

It follows that the second hot runner means 6*b* has second and third hot runners 24, 48 for the second and third plastic materials, said hot runners 24, 48 being connected to the valve pin axial bore 17 for each injection nozzle 5 for the purpose of feeding the second and third plastic materials into the central melt bore 10 of each injection nozzle 5—which contains also the valve needle 9—via the valve needle axial bore 17 in a manner which is shown in detail in FIG. 3 as well as in FIG. 5*a* to 5*e* and which will be explained more precisely hereinbelow. The pouring openings 25 and 52, which are arranged on the second hot runner manifold 6*b* such that they are provided on different levels and displaced by approx. 90°, are connected to the hot runners 24 for the second plastic material and to the melt distributing passages 48 for the third plastic material in the manner explained hereinbefore. The hot runner manifolds 6*a*, 6*b* are heated via the electric connections 62, 63 in the conventional manner by means of integrally embedded heating elements 26, which are bonded to said hot runner means 6*a*, 6*b*, (cf. FIG. 1 and 2), so as to guarantee—depending on the selected combination of materials for the first plastic material on the one hand and for the second and third plastic materials on the other—an optimum temperature of the melt along the hot runners 19, 24 and 48.

Depending on the required viscosity and operating temperature for the first, second and third plastic materials, which are guided through the first and second hot runner manifolds 6*a*, 6*b*, respectively, the temperature of each hot runner manifold 6*a*, 6*b* can be different, and said temperatures can be controlled in connection with thermocouples, which are not shown in this embodiment. The maximum viscosity of the melt of the third plastic material corresponds preferably to the viscosity of the second plastic material, and the viscosity of the second plastic material, which preferably defines a core layer of the injection moulded part, is preferably equal to or lower than the viscosity of the first plastic material, which, serving as a basic material, embeds the core material. Due to the sealing and sliding fit between the hot runner manifolds 6*a*, 6*b*, which is guaranteed by means of the sealing sleeve discs 13, 23 in connection with the passage insulating sleeve 21*b*, said hot runner manifolds 6*a*, 6*b* can carry out thermal expansion movements relative to each other as already mentioned. In the second embodiment, the distribution of the first and second substantial melts corresponds to that of the first embodiment.

As can especially be seen from FIG. 6 as well as from FIG. 5*a* to 5*e*, the second melt hot runners 24 open into the axial bore 17, which also accommodates therein the valve pin 9 of the second manifold 6*b*.

The axial bore 17 opens into a guide bore of a guide sleeve 14 for the valve needle 9, said guide sleeve 14 engaging the upper end of said axial bore 17 by means of a tubular projection 14*b*. The tubular projection 14*b* serves to seal the axial bore 17 in the direction of a hydraulic actuating means 15 for each valve pin as well as to deflect the melt of the second plastic material from the respective melt-distributing passage 24 into the axial bore 17 leading to the melt bore 10 of each injection nozzle 5, the engagement end of the tubular projection 14*b* being, for this purpose, provided with an inclined surface facing the mouth of the respective hot runner 24.

The hot runner 48 for the third plastic melt extend through the second hot runner manifold 6*b* in a horizontal plane parallel and downwards of the plane of the hot runners 19 up to a point which is located close to the respective axial bores 17. In the present case, it is preferred to feed the third plastic material at the outer periphery of the second plastic material, which is fed into the axial bore 17 upstream of said third plastic material, in the area between said second and said first hot runner plates 6b, 6a. The sealing sleeve discs 13, which are arranged in the area of each axial bore 17 between the two hot runner manifolds 6a, 6b, are used for this purpose, said sealing sleeve disc 13 abutting with a slide surface 49 on a lower end face 50, which forms part of the second hot runner manifold 6b (and which faces the first hot runner manifold 6a), and having in said slide surface 49 an annular passage 51a, which is respectively connected to a third hot runner 48 and which communicates with the coaxial axial bore 17 through a central bore 53 of the sealing sleeve disc 13. In addition, the end face 50 of the second hot runner manifold 6b has provided therein a counter-annular passage 51b, which corresponds to the annular passage 51a in the sealing sleeve disc 13 and into which an end section 48a of the respective third hot runner 48 terminates. The annular passage 51a in the sealing sleeve disc 13 and the counter-annular passage 51b in the second hot runner manifold 6b define, in combination, preferably a full-circle cross-section, and, for the purpose of connecting the annular recess 51a, 51b to the central bore 53 in the sealing sleeve disc 13, there is provided at least one introduction gap of preferably selectable width, said introduction gap being used for uniformly applying to an outer peripheral area of the melt flow of second plastic material in the central bore 53 the third plastic material from the annular recess 51a, 51b in the area of a boundary surface between the second hot runner manifold 6b and the sealing sleeve disc 13. For connecting the annular recesses 51a and 51b to a horizontal section of the hot runners 48, each of said hot runners 48 is provided with an axial section 48a extending axially parallel to the axial bore 17.

On the basis of the above-described arrangement, in the case of which the third plastic material is added to the second plastic material, at a location downstream of the point where said second plastic material flows into the axial bore 17, so as to form a controlled, peripheral melt film close to a respective injection nozzle 5, it is possible to feed the second and third plastic materials as composite materials to the central melt bore 10 of each injection nozzle 5 and from said injection nozzle to a moulding cavity for forming, in an injection moulded part, a core or barrier layer consisting of the second plastic material and an adhesive connection layer provided between said first and second plastic materials and consisting of the third plastic material. In the case of certain kinds of injection moulding tasks, the third plastic material in the annular recesses 51a, 51b can be maintained in a depressurized state to a very large extent and the vacuum generated in the introduction gap by the melt flow of the second plastic material through the axial bore 17 and the central bore 53 can be sufficient to produce a suction effect sucking the third plastic material from the annular recesses 51a, 51b so as to form a thin coating on the melt flow of the second plastic material. Depending e.g. on the viscosity of the third plastic material, the cross-sectional configuration of the annular recesses 51a, 51b can vary within wide limits and may, for example, also include a melt storage space which opens into an annular nozzle gap, which, in turn, communicates with the axial bore 17 and the central bore 53, respectively.

The material used as first plastic material is preferably polypropylene, the material used as second plastic material is preferably polyamide (nylon), and the material used as third plastic material is preferably ethylene-vinyl-alcohol; the injection moulding system and the method according to the present invention are, however, not limited to the use of such a combination of materials. It is, for example, also possible to use ethylene-vinyl-alcohol as the second plastic material and ethylene-vinyl-acetate as the third plastic material. The second plastic material (barrier layer) can also extend only partially in the first plastic material, and in a sub-area of the cross-section of the injection moulded part it can extend such that it is at least partially embedded in said first plastic material.

Depending on the volume percentages of the first, second and third plastic materials in the finished injection moulded part, the materials are supplied to the injection nozzles 5 while effecting pressure and/or volume control of the melts of said first, second and third plastic materials, the percentage of the third plastic material being lower than the percentages of the first and second plastic materials and the second plastic material being normally provided in smaller amounts than the first plastic material. In the present case, this finds expression in a flow cross-section of the third melt-distributing passage 48 for the third plastic material which is reduced in size in comparison with the melt distributing passages 19, 24 for the first and second plastic materials.

It is thus possible to supply in an advantageous manner, with the aid of the first and second hot runner manifolds 6a, 6b and with the aid of the hot runners 19, 24, 48 which are provided in said first and second hot runner manifolds independently of one another, the melt of the first plastic material through the first and second melt bores 29a, 29b of each injection nozzle 5 separately from the second and third melts of the second and third plastic materials, which are conveyed jointly, but in an essentially unmixed condition, through the central melt bore 10 of each injection nozzle 5, and to make it available in the area of the gate 12 of an associated moulding cavity of the multi-cavity injection moulding system.

Figure 5:
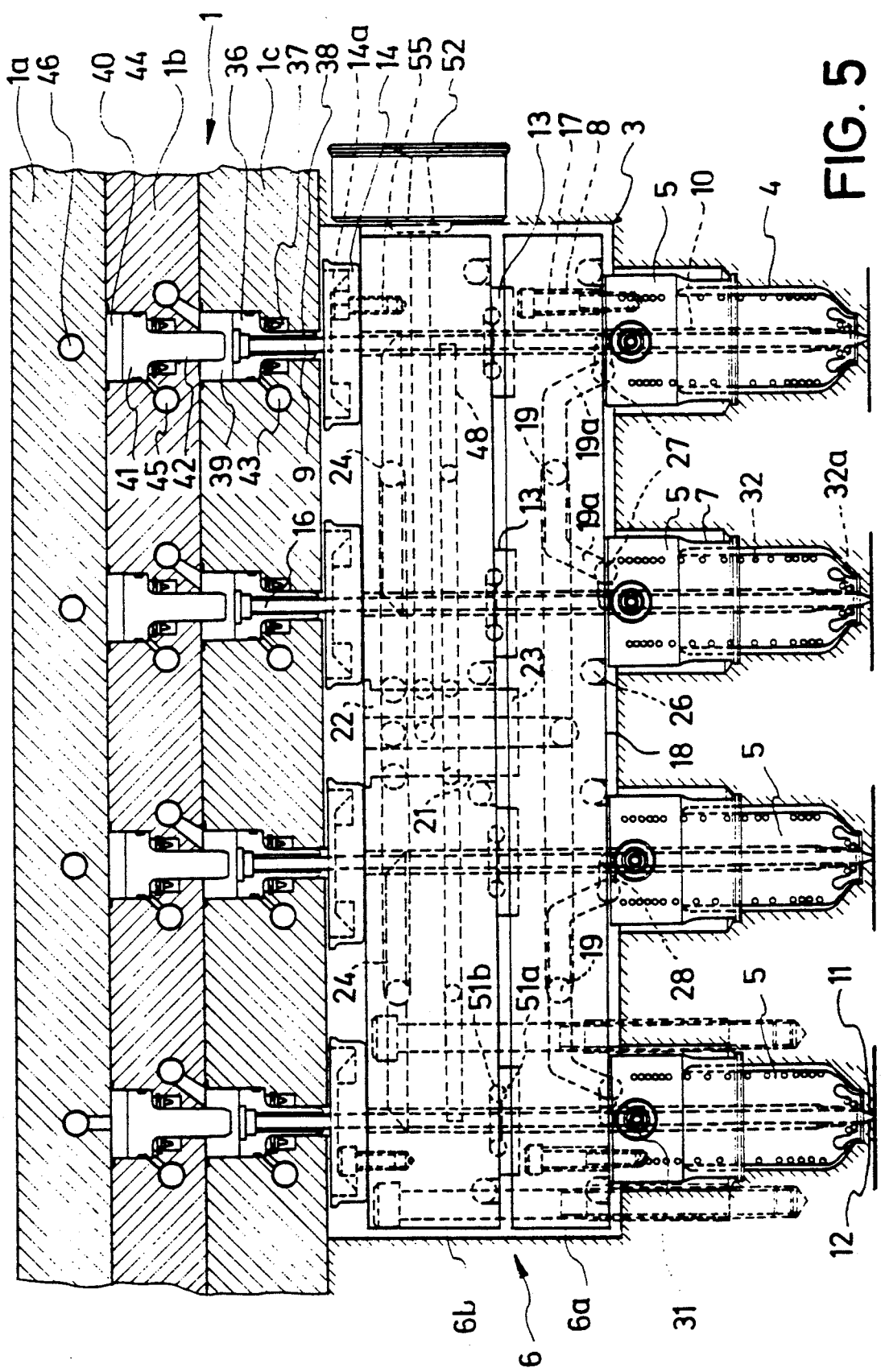
FIG. 5 shows a fragmentary front view, similar to FIG. 1, of the injection moulding system (partially in a sectional view) according to FIG. 4.

In FIG. 4 and 5, reference numeral 31 is used for referring to the electric connections for a heating element 32, which is provided in each of the heated injection nozzles 5 of the multi-cavity injection moulding system.

The operation of the system as indicated in FIGS. 5a to 5e corresponds to the injection cycle described above, referring to FIGS. 3a to 3e, except of the coinjection of the second and third material as a combined melt flow. Accordingly, with respect to the different phases of the injection cycle shown in FIGS. 8a to 8e, reference is made to the description of FIGS. 3a to 3e above.

In the second embodiment, the valve pin 9 extends from the location where it is received in the reception piston 36 through the guide sleeve 14, which is arranged between the lower backplate 1c and the second hot runner manifolds 6b and which has, on the one hand, an annular recess 14a for receiving therein the heads of the screws 8 used for fastening the guide sleeve to the second hot runner manifold 6b and, on the other hand, a cylindrical tubular projection 14b by means of which said guide sleeve 14 engages the respective axial bore 17, is also used for centering said guide sleeve 14. The tubular projection 14b also serves to seal the axial bore 17 with respect to the hydraulic actuating device 15 and the deflect the melt flow of the second plastic material, which comes from the hot runners 24, into the axial bore 17 leading to the central melt bore 10. Moreover, the guide sleeve 14 is used as an axial pressure reception sleeve against the lower, third backplate 1c.

As is clearly shown in FIG. 5, 6 and 8a to 8e each sealing sleeve disc 13, which forms simultaneously an annular distributing member for the third plastic material towards the axial bore 17, is received as an insert in the first hot runner manifold 6a, which is provided with a corresponding insertion recess. In the area of said insertion recess, respective tapped holes are provided, which extend through the hot runner manifold 6a in the vertical direction and which serve to receive therein fastening screws 8 for securing the respective associated injection nozzle 5 to the first hot runner manifold 6a. When the injection nozzles 5 have been installed on the first hot runner manifold 6a, the first and the second hot runner manifolds 6a, 6b are screw-fastened to the moulding cavity plate 3 by means of screws 47.

In the present embodiments, polypropylene is used as the first plastic material of the injection moulded part defining the basic material, whereas polyamide (nylon), provided with a connection layer of ethylene-vinyl-alcohol, is injected as a second plastic material for forming an oxygen-impervious barrier layer. It is, of course, also possible to use ethylene-vinyl-alcohol as a second plastic material, said substance being then preferably used in connection with ethylene-vinyl-acetate as a third plastic material.

The present invention is, of course, not limited to these materials, but it is just as well possible to use other suitable combinations of materials, which contain, for example, ethylene-vinyl-alcohol, depending in the respective fields of use and the processibility of the materials in an integral injection moulding process. A composite material consisting of the second and third plastic materials should, however, have a viscosity which is, at the most, equal to that of the first plastic material and which should preferably be lower than the viscosity of the first plastic material.

Nor is the injection moulding system limited to the use of needle valve gating, although this type of gating turns out to be particularly advantageous. On the contrary, it would also be possible to dispense with the valve pin explained in the above embodiment as well as with the associated hydraulic actuating device and to effect thermal valve gating by means of freezing and melting a plug of plastic material in connection with the control of the tip end of the heating element in the nozzle mouthpiece. Also this type of valve gating would permit separate injection of the various plastic materials while effecting volume and pressure control of the melt pressure of the melts of said first and second plastic materials in separate melt passage means.

The embodiments of the invention in which an exclusive property or privilege is claimed are defined as follows:

1. A multi-cavity injection molding apparatus comprising a back plate arrangement, a hot runner manifold arrangement and a cavity plate, said hot runner manifold arrangement comprising a first hot runner manifold having a first melt supply channel for a first plastic material and a second hot runner manifold having a second melt supply channel for a second plastic material wherein the first and second hot runner manifolds form manifold plates disposed substantially in parallel one behind the other between the cavity plate and the back plate arrangement and wherein the first hot runner manifold supports injection nozzles and is positioned in front of the second hot runner manifold, said first melt supply channel extending from a central first pour opening through said back plate arrangement as well as through the second hot runner manifold and into the first hot runner manifold, said first melt supply channel branching into first hot runners extending substantially horizontally therein and said hot runners and said second melt supply channel connected to respective melt bores of each injection nozzle.

2. A multi-cavity injection molding apparatus as claimed in claim 1 wherein the second melt supply channel extends from a lateral second pour opening and branches in second hot runners extending substantially horizontally in the second hot runner manifold to a plurality of axial bores, each axial bore extending forwardly in the second hot runner manifold and through the first hot runner manifold to a melt bore of a respective injection nozzle.

3. A multi-cavity injection molding apparatus as claimed in claim 2, wherein the first and second hot runner manifolds are fixed relative to each other and a plurality of sealing sleeve disks are interposed between said first and second hot runner manifolds, said sleeve disks defining a section of the axial bores extending forwardly to the melt bores of the injection nozzles.

4. A multi-cavity injection molding apparatus as claimed in claim 3, wherein a sealing sleeve is interposed between said first and second hot runner manifolds defining a section of the first melt supply channel for the first plastic material.

5. A multi-cavity injection molding apparatus as claimed in claim 4, wherein the hot runners of the first hot runner manifold comprise inclined guide sections each opening into a recess, said recess being equally provided in a front face of the first hot runner manifold and in the rear surface of the injection nozzle, said recess communicating with the melt bores of the injection nozzle for the first plastic material.

6. A multi-cavity injection molding apparatus as claimed in claim 5, wherein the recesses of neighboring injection nozzles are disposed paired opposite to each other, and the inclined guide sections communicate symmetrically and in pairs from a respective hot runner to the associated opposite paired recesses of a pair of related injection nozzles.

7. A multi-cavity injection molding apparatus as claimed in claim 6 wherein a third melt supply channel extends from a lateral third pour opening and branches in third hot runners extending substantially horizontally in the second hot runner manifold to the axial bores extending forwardly to the melt bores of the injection nozzles.

8. A multi-cavity injection molding apparatus as claimed in claim 7, wherein a central sleeve extends through the second hot runner manifold to define a portion of the first melt supply channel to convey the first plastic material from the central first pour opening to the first hot runner manifold and distribute the second and third plastic materials within the second hot runner manifold.

9. A multi-cavity injection molding apparatus as claimed in claim 8, wherein the second supply channel for the second plastic material extends from the second pour opening which is arranged laterally on the second hot runner manifold to the central sleeve, and the third supply channel for the third plastic material extends from the third pour opening which is arranged laterally on the second hot runner manifold to the central sleeve, in that the first, second and third supply channels extend substantially at an angle of 90° relative to one another, and in that the central sleeve is provided with first and second circumferential recesses which are formed separately from each other and which connect the second supply channel to the second branched hot runners for the second plastic material extending substantially horizontally therein, and connect the third supply channel to the third branched hot runners for the third plastic material, extending substantially horizontally through the second hot runner manifold, wherein said second and third hot runners of the second hot runner manifold substantially extends in horizontal, spaced-apart planes in such a way that, the second hot runners open into the forwardly extending axial bores at a position upstream of where the third hot runners open into said axial bores.

10. A multi-cavity injection molding apparatus as claimed in claim 9, wherein the circumferential recesses connect to axially spaced circumferential annular grooves.

11. A multi-cavity injection molding apparatus as claimed in claim 10, wherein said sealing sleeve disks which define a section of the forwardly extending axial bores each having a rear face which abuts against a front end face of the second hot runner manifold and a circumferential recess is formed between the rear face of each sealing sleeve disk and the front end face of the second hot runner manifold, each circumferential recess being connected to one of the forwardly extending axial passages and to one of the third hot runners via a vertical branch passage.

12. A multi-cavity injection molding apparatus as claimed in claim 11 wherein each injection nozzle has a nozzle tip, a central melt bore, and first and second axial melt bores spaced from the central melt bore, the first and second melt bores extending axially through the injection nozzle to convey the first plastic material from the recess in the rear surface to a melt reception space in the nozzle tip of the injection nozzle, the central melt bore extending in alignment with one of the axial bores in the first and second hot runner manifolds to convey the second plastic material through the injection nozzle and to receive a valve pin which is driven by hydraulic actuating means provided in the back plate arrangement.

13. A multi-cavity injection molding apparatus as claimed in claim 12, wherein the valve pin has a rear end which is received in an actuating piston which is sealingly arranged in a cylinder of the back plate arrangement, said cylinder being adapted to be independently acted upon by fluid pressure at both sides of the piston, and that a control passage is provided in the back plate arrangement which communicates with said cylinder.

14. A multi-cavity injection molding apparatus as claimed in claim 13, wherein the back plate arrangement comprises a first back plate, a second back plate, and a rear third back plate, the second back plate which seals the piston cylinders of the first back plate accommodates a stop piston which is slideably moveable within an associated cylinder, a cylindrical stop member of said stop piston projecting into the piston cylinder whereby the associated cylinders of the second back plate with the stop pistons therein are covered by the rear, third back plate, which is provided with hydraulic control passages for applying a control pressure to the stop piston the said second back plate comprising control passages for applying a control pressure to the stop piston and to the actuating piston and the third back plate being bolted to the cavity plate such that the first and second back plates are included.

15. A multi-cavity injection molding apparatus as claimed in claim 14, wherein each injection nozzle is provided with a heating element which is integral therein said heating element extends to the nozzle tip of the respective injection nozzle such that it surrounds the central melt bore.

* * * * *